(12) United States Patent
Mohamed et al.

(10) Patent No.: US 10,397,221 B2
(45) Date of Patent: Aug. 27, 2019

(54) NETWORK CONTROLLER PROVISIONED MACSEC KEYS

(71) Applicant: Hewlett-Packard Development Company, L.P., Houston, TX (US)

(72) Inventors: Parvez Syed Mohamed, Roseville, CA (US); Shaun K. Wakumoto, Roseville, CA (US); Craig J. Mills, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 89 days.

(21) Appl. No.: 14/763,484

(22) PCT Filed: Jan. 31, 2013

(86) PCT No.: PCT/US2013/024072
§ 371 (c)(1),
(2) Date: Jul. 24, 2015

(87) PCT Pub. No.: WO2014/120190
PCT Pub. Date: Aug. 7, 2014

(65) Prior Publication Data
US 2015/0365409 A1 Dec. 17, 2015

(51) Int. Cl.
*G06F 21/60* (2013.01)
*H04L 29/06* (2006.01)
*H04L 29/12* (2006.01)

(52) U.S. Cl.
CPC ...... *H04L 63/0876* (2013.01); *H04L 61/6022* (2013.01); *H04L 63/0272* (2013.01); *H04L 63/061* (2013.01); *H04L 63/062* (2013.01); *H04L 63/0435* (2013.01); *H04L 63/162* (2013.01)

(58) Field of Classification Search
CPC ............ H04L 63/0876; H04L 61/6022; H04L 63/061; H04L 63/0435; H04L 63/162
See application file for complete search history.

(56) References Cited

U.S. PATENT DOCUMENTS

| 6,556,541 | B1* | 4/2003 | Bare | H04L 12/185 370/235 |
| 7,724,899 | B2 | 5/2010 | Han et al. | |
| 7,729,276 | B2 | 6/2010 | Akyol | |
| 2007/0133791 | A1* | 6/2007 | Han | H04L 9/12 380/46 |

(Continued)

OTHER PUBLICATIONS

Cisco., "Configuring MACsec Encryption", Dec. 2012, 16 pages, Retrieved from http://www.cisco.com/en/US/docs/switches/lan/catalyst3750x_3560x/software/release/15.0_1_se/configuration/guide/swmacsec.pdf.

(Continued)

*Primary Examiner* — Wasika Nipa
(74) *Attorney, Agent, or Firm* — Brooks, Cameron & Huebsch, PLLC

(57) ABSTRACT

Methods, network controllers, and machine-readable and executable instructions are provided for network controller provisioned MACsec keys. A network controller can provision a first network device with a media access control security (MACsec) key for a MACsec flow. The network controller can provision a second network device with the MACsec key for the MACsec flow.

12 Claims, 3 Drawing Sheets

(56) References Cited

U.S. PATENT DOCUMENTS

| | | | | |
|---|---|---|---|---|
| 2008/0123652 | A1* | 5/2008 | Akyol | H04L 12/4633 370/392 |
| 2008/0126559 | A1* | 5/2008 | Elzur | H04L 63/0464 709/232 |
| 2008/0130894 | A1* | 6/2008 | Qj | H04L 63/0485 380/277 |
| 2008/0141023 | A1 | 6/2008 | Qi | |
| 2008/0192739 | A1 | 8/2008 | Carrasco | |
| 2009/0217032 | A1* | 8/2009 | Guan | H04L 63/08 713/154 |
| 2010/0042831 | A1* | 2/2010 | Bahr | H04L 63/0464 713/160 |
| 2011/0010770 | A1 | 1/2011 | Smith et al. | |
| 2011/0087878 | A1 | 4/2011 | Weis et al. | |
| 2012/0045063 | A1* | 2/2012 | Weis | G06Q 20/3829 380/277 |

OTHER PUBLICATIONS

Mohamed, et al., "Frame Passing Based on Ethertype", PCT Application Number: PCT/US 2012/030512, filed Mar. 26. 2012, 22 pages.

Brian Weis "LAN-Based Key Server (LKS) for IEEE 802.1af," May 30, 2006, pp. 1-22, 802.1 Security Interim Meeting, IEEE.

Extended European Search Report, EP Application No. 13874117.8 dated Sep. 12, 2016, pp. 1-11, EPO.

Khan Ferdous Wahid, "Rethinking the Link Security Approach to Manage Large Scale Ethernet Network," 17th IEEE Workshop on Local and Metroplitan Area Networks, May 5, 2010, pp. 1-6, IEEE.

Cisco, "Identity-based Networking Services: Mac Security", May, 2011. http://www.cisco.com/en/US/prod/collateral/iosswrel/ps6537/ps6586/ps6638/deploy_guide_c17-663760.pdf.

International Search Report and Written Opinion dated Oct. 25, 2013 issued on PCT Patent Application No. PCT/US2013/024072 dated Jan. 31, 2013, Korean Intellectual Property Office.

\* cited by examiner

NETWORK CONTROLLER PROVISIONED MACSEC KEYS

CLAIM FOR PRIORITY

The present application is a national stage filing under 35 U.S.C. 371 of PCT application number PCT/US2013/024072, having an international filing date of Jan. 31, 2013, the disclosure of which is hereby incorporated by reference in its entirety.

BACKGROUND

The Institute of Electrical and Electronics Engineers (IEEE) may specify a number of standards for network traffic including, for example, IEEE 802.1AE media access control security (MACsec) standard, which defines connectionless data confidentiality and integrity for media access independent protocols. Another example includes IEEE 802.1X-2010, which describes key management and the establishment of secure associations.

DETAILED DESCRIPTION

Figure 1:
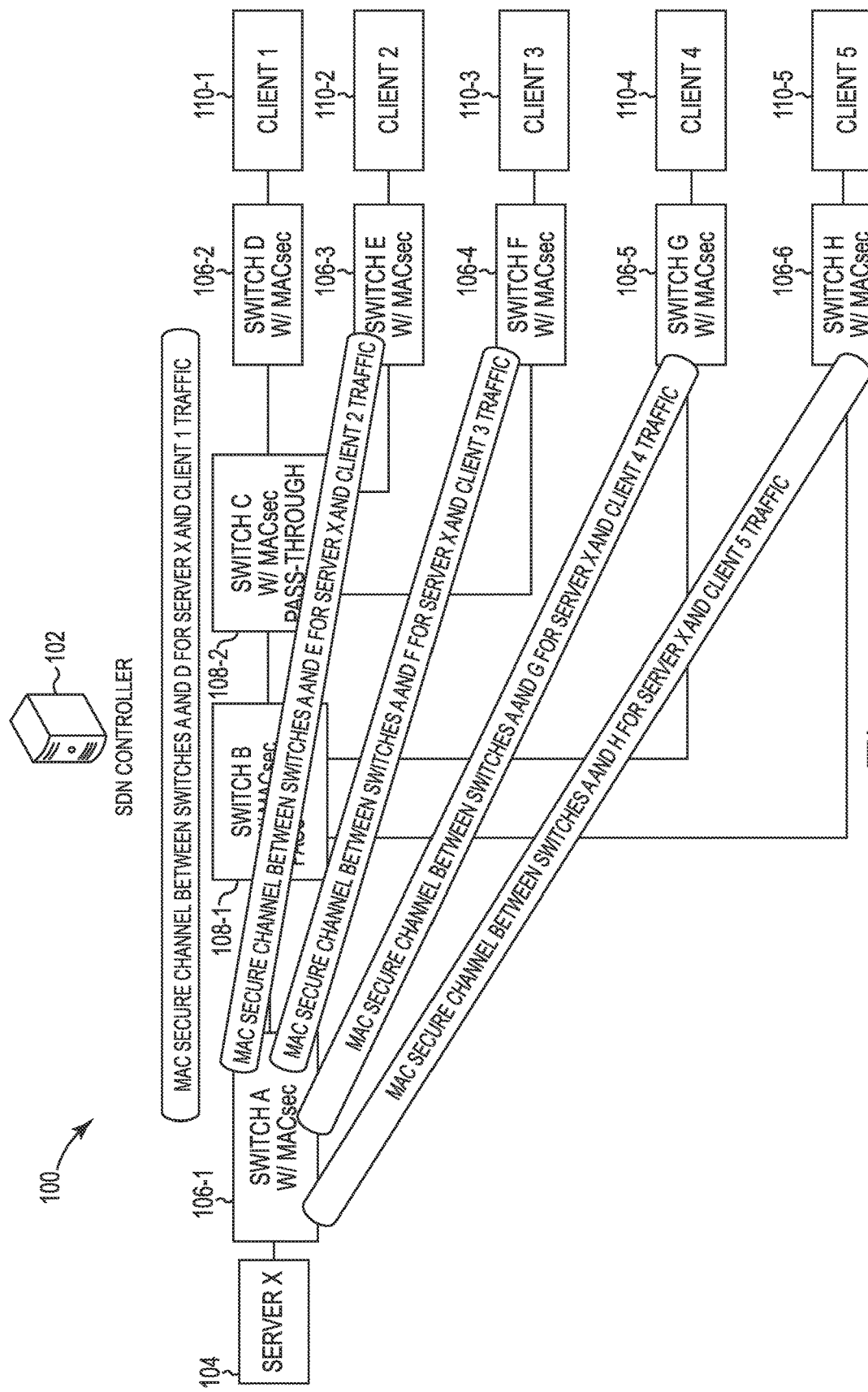
FIG. 1 is a diagram illustrating an example of a Layer 2 network according to the present disclosure.

Media access control security (MACsec) can include a defined frame format, which can be similar to an Ethernet frame with additional fields such as a security tag (e.g., an extension of the Ethertype) and message authentication code. The security tag in each MACsec frame can include an association number within the channel, a packet number to provide a unique initialization vector for encryption and authentication algorithms as well as protection against replay attack. MACsec can utilize secure connectivity associations that represent groups of stations connected via unidirectional secure channels. Security associations within each secured channel use their own encryption/decryption keys. MACsec may be used between switches on a Layer 2 network and may not be appropriate for communication across a Layer 3 network (e.g., across routers).

Each switch in a communication path of a MACsec flow may be generally responsible for negotiating keys using IEEE 802.1X-2010 and the MACsec key exchange agreement (MKA) protocol. Thus, each MACsec switch has full visibility of the traffic since each MACsec switch has a valid key for the MACsec flow. However, for a secure infrastructure, the entire network (or at least the portions of the network participating in MACsec communication) need to have MACsec capable devices, which can be costly to deploy. Furthermore, key negotiation at each hop between switches in a MACsec network can add latency to the MACsec flow.

MACsec was designed to work as a hop-by-hop security mechanism. Using FIG. 1 as an example, in order to provide a complete, secure path between Server X and Client 1, MACsec secure associations should be setup between Switch A-Switch B, between Switch B-Switch C, and between Switch C-Switch D. Furthermore, MACsec allows for the use of different keys in different directions of MACsec flows. For example, there may be a key used for traffic being forwarded from Switch A to Switch D and a different key for traffic forwarded from Switch D to Switch A. Switch A could use key X to encrypt traffic and Switch D would use key X to decrypt the traffic. Likewise, Switch D could use key Z to encrypt the traffic and Switch A would use key Z to decrypt the traffic. Key X and key Z may not be equal to one another.

In contrast, a number of examples of the present disclosure can employ methods, network controllers, and machine-readable and executable instructions for network controller provisioned MACsec keys. For example, a network controller can provision a first network device with a MACsec key for a MACsec flow. The network controller can provision a second network device with the MACsec key for the MACsec flow. According to a number of examples of the present disclosure, the number of devices participating in MACsec can be reduced and the complexity and overhead of doing key exchange protocols on switches themselves can be avoided.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a diagram illustrating an example of a Layer 2 network 100 according to the present disclosure. The Layer 2 network 100 can include a network controller 102 (e.g., a software-defined networking (SDN) network controller). SDN is a form of network virtualization in which the control plane is separated from the data plane and implemented in a software application. Network administrators can therefore have programmable central control of network traffic without requiring physical access to the network's hardware devices. One example of a protocol for SDN is OpenFlow, which is a communications protocol that gives access to the forwarding plane of a network switch over the network. Some examples of the present disclosure can operate according to an OpenFlow, or other SDN protocol, and/or a hybrid of an SDN protocol combined with "normal" networking.

The network controller 102 can be in communication with and/or have control over network devices 106-1, 106-2, 106-3, 106-4, 106-5, 106-6, 108-1, and 108-2. For example, network devices 106-1, 106-2, 106-3, 106-4, 106-5, and 106-6 can be MACsec enabled switches. Network devices 108-1 and 108-2 can be switches that are either MACsec enabled or not. Examples are not limited to the specific number of network devices illustrated in the Layer 2 network 100. Of note, a MACsec enabled network device 106-1 is coupled to a first network entity (e.g., server X 104) to provide a first endpoint of a MACsec flow and a MACsec enabled network device 106-2, 106-3, 106-4, 106-5, 106-6 is coupled to each of client 110-1, client 110-2, client 110-3, client 110-4, and client 110-5 to provide a respective endpoint for a MACsec flow. The network devices 108-1, 108-2 therebetween are indicative of any number of network devices therebetween (with respect to the MACsec flow) depending on the size of the Layer 2 network 100. Although not specifically illustrated as such, a MACsec flow endpoint could alternatively be a server (e.g., server X 104) and/or client (e.g., client 110-1) rather than a switch (e.g., switch 106-1 and/or switch 106-2), however the respective endpoint would then be in communication with the network controller 102 in order to be provisioned with keys according to a number of examples of the present disclosure.

In the example illustrated in FIG. 1, the network controller 102 established a first MACsec flow between switch 106-1 and switch 106-2 for communication between server 104 and client 110-1. The first MACsec flow includes a secure channel between switch 106-1 and switch 106-2 through switches 108-1 and 108-2. The MACsec flow can remain encapsulated through switches 108-1 and 108-2 while the switches 108-1 and 108-2 do not have keys for the MACsec flow. Thus, the network controller 102 can provision switches 106-1 and 106-2 with key(s) for the MACsec flow, while not provisioning switches 108-1 and 108-2 with such key(s). Thus, none of the switches 106-1, 108-1, 108-2, 106-2 in the path of the first MACsec flow need to negotiate a key for the MACsec flow with another switch, which can decrease overhead on the switches 106-1, 108-1, 108-2, 106-2 and/or increase throughput of the MACsec flow. In the example of FIG. 1, switch 106-1 has five unique MACsec secure associations that it maintains. According to some previous approaches, if the traffic through switch 106-1 forces keys to expire often, then switch 106-1 will spend many processing cycles performing MKA negotiations with its MACsec secure association neighbors. Furthermore, according to the present disclosure, switches 108-1 and 108-2 need not even be MACsec capable as they do not need a key to process the MACsec flow, but can merely pass the frames along according to their header information, which is not encrypted.

As is also illustrated in FIG. 1, the network controller 102 established a second MACsec flow between switch 106-1 and switch 106-3 for communication between server 104 and client 110-2. The second MACsec flow includes a secure channel between switch 106-1 and switch 106-3 through switches 108-1 and 108-2. The network controller 102 established a third MACsec flow between switch 106-1 and switch 106-4 for communication between server 104 and client 110-3. The third MACsec flow includes a secure channel between switch 106-1 and switch 106-4 through switches 108-1 and 108-2. The network controller 102 established a fourth MACsec flow between switch 106-1 and switch 106-5 for communication between server 104 and client 110-4. The fourth MACsec flow includes a secure channel between switch 106-1 and switch 106-5 through switch 108-1. The network controller 102 established a fifth MACsec flow between switch 106-1 and switch 106-6 for communication between server 104 and client 110-5. The fifth MACsec flow includes a secure channel between switch 106-1 and switch 106-6 through switch 108-1.

The network controller 102 can include a processing resource in communication with a memory resource. The memory resource can include a set of instructions, executable by the processing resource to perform a number of functions described herein. For example, the network controller 102 can provision a first switch 106-1 with a first MACsec key for a first MACsec flow, where the first switch 106-1 can be a first endpoint of the MACsec flow. The network controller 102 can provision the first switch 106-1 with a second MACsec key for a second MACsec flow, where the first switch 106-1 is a first endpoint of the second flow. The network controller 102 can provision a second switch 106-2 with the first MACsec key, where the second switch 106-2 is a second endpoint of the first MACsec flow. The network controller can provision a third switch 106-3 with the second MACsec key, where the third switch 106-3 is a second endpoint of the second MACsec flow.

The network controller 102 can set forwarding rules for a MACsec flow on a number of switches 108-1, 108-2 between, with respect to the MACsec flow, the switches (e.g., switches 106-1, 106-2) comprising endpoints of the MACsec flow. For example, switch 106-1 can encrypt the MACsec flow using a key provisioned by the network controller 102, and switch 106-2 can decrypt the MACsec flow using the key provisioned by the network controller 102. However, any of a number of switches 108-1, 108-2 between the endpoints (e.g., switches 106-1, 106-2) of the MACsec flow may neither encrypt nor decrypt the MACsec flow. Such examples can be beneficial in reducing the number of network devices that would otherwise have to negotiate MACsec keys and/or be MACsec enabled. This can provide a substantial cost savings as MACsec is a relatively new technology and currently deployed non-MACsec devices would otherwise need to be replaced with MACsec capable devices in order to support a robust MACsec deployment according to some previous approaches. Many organizations might not be willing to do a "forklift replacement" of their network due to such costs. Any additional latency added by having the network controller 102 perform MACsec operations according to the present disclosure should be unnoticeable to most users.

Figure 2:
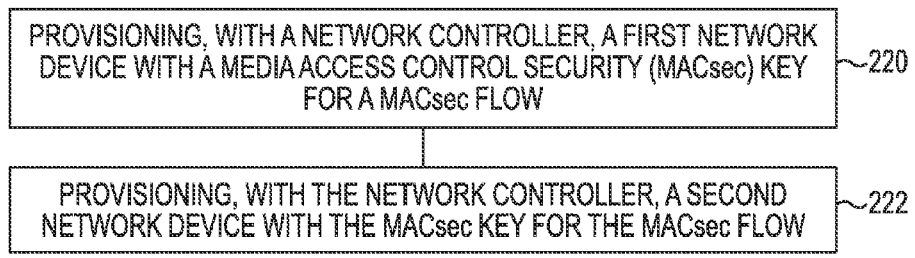
FIG. 2 is a flow chart illustrating an example of a method for network controller provisioned MACsec keys according to the present disclosure.

FIG. 2 is a flow chart illustrating an example of a method for network controller provisioned MACsec keys according to the present disclosure. At block 220, the method can include provisioning, with a network controller (e.g., network controller 102 illustrated in FIG. 1), a first network device with a media access control security (MACsec) key for a for a MACsec flow. At block 222, the method can include provisioning, with the network controller, a second network device with the MACsec key for the MACsec flow. In some examples the key can be symmetric between the first and the second network devices. The network controller can provision the network devices with updated MACsec keys as appropriate.

In some examples, the network controller can provision various network devices with sets of MACsec keys. In such examples, the network controller can instruct the network devices which of the set of MACsec keys to use for a particular MACsec flow. Using sets of keys is described in more detail below with respect to FIG. 3.

In some instances, MACsec may not be desired for a particular Layer 2 flow. In such instances, the network controller can be configured to establish a flow without encrypting the data.

Figure 3:
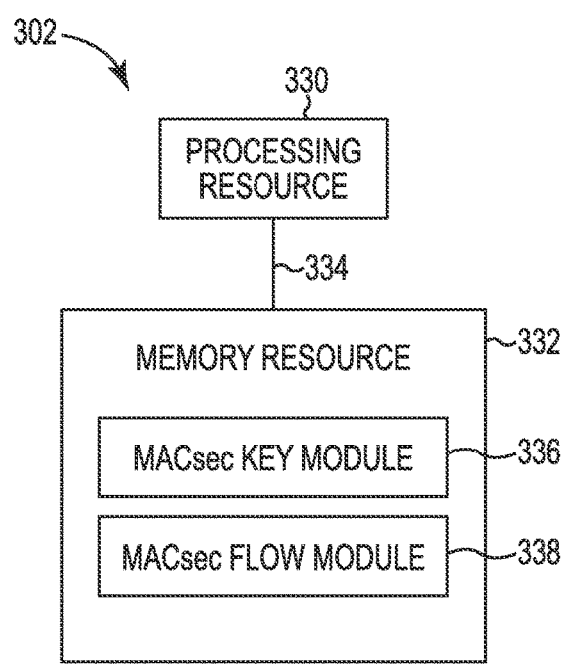
FIG. 3 illustrates an example of a network controller according to the present disclosure.

FIG. 3 illustrates an example of a network controller according to the present disclosure. The network controller 302 can be analogous to the network controller 102 illustrated in FIG. 1. The network controller 302 can utilize software, hardware, firmware, and/or logic to perform a number of functions.

The network controller 302 can be a combination of hardware and program instructions configured to perform a number of functions (e.g., actions). The hardware, for example, can include a number of processing resources 330 and a number of memory resources 332, such as a machine-readable medium (MRM) or other memory resources 332. The memory resources can be internal and/or external to the network controller 302 (e.g., the network controller 302 can include internal memory resources and have access to external memory resources). The program instructions (e.g., machine-readable instructions (MRI)) can include instructions stored on the MRM to implement a particular function (e.g., an action such as managing PoE on a network switch). The set of MRI can be executable by one or more of the processing resources 330. The memory resources 332 can be coupled to the network controller 302 in a wired and/or wireless manner. For example, the memory resources 332 can be an internal memory, a portable memory, a portable disk, and/or a memory associated with another resource, e.g., enabling MRI to be transferred and/or executed across a network such as the Internet.

Memory resources 332 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 330 can be coupled to the memory resources 332 via a communication path 334. The communication path 334 can be local or remote to the network controller 302. Examples of a local communication path 334 can include an electronic bus internal to a machine, where the memory resources 332 are in communication with the processing resources 330 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 334 can be such that the memory resources 332 are remote from the processing resources 330, such as in a network connection between the memory resources 332 and the processing resources 330. That is, the communication path 334 can be a network connection. Examples of such a network connection can include local area network (LAN), wide area network (WAN), personal area network (PAN), and the Internet, among others.

As shown in FIG. 3, the MRI stored in the memory resources 332 can be segmented into a number of modules 336, 338 that when executed by the processing resources 330 can perform a number of functions. As used herein a module includes a set of instructions included to perform a particular task or action. The number of modules 336, 338 can be sub-modules of other modules. For example, the MACsec flow module 338 can be a sub-module of the MACsec key module 336 and/or the MACsec key module 336 and the MACsec flow module 338 can be contained within a single module. Furthermore, the number of modules 336, 338 can comprise individual modules separate and distinct from one another. Examples are not limited to the specific modules 336, 338 illustrated in FIG. 3.

The network controller 302 can include a MACsec key module 336, which can provision a first network device with a set of MACsec keys and provision a second network device with the set of MACsec keys. The network controller 302 can include a MACsec flow module 338, which can instruct the first network device to encrypt a MACsec flow using a particular MACsec key from the set of MACsec keys and instruct the second network device to decrypt the MACsec flow using the particular MACsec key from the set of MACsec keys. The network controller 302 can define the first and the second network devices as endpoints of the MACsec flow and not instruct network devices between, with respect to the MACsec flow, the first network device and the second network device regarding MACsec keying.

The network controller 302 can instruct the network devices to use a different MACsec key from the set of MACsec keys after a number of packets have been encrypted/decrypted. MACsec packets can include a 32-bit packet number that is incremented with each packet in order to protect against replay attacks. When the packet number hits its max value, a new MACsec key may be used (e.g., either the network controller can provision respective network devices with a new key, instruct the respective network devices to use a new key from the set of keys, or the network devices can be configured to automatically use a next key in the set). A 32-bit packet number corresponds to 4,294,967,296 packets.

The network controller 302 can instruct network devices to use a different MACsec key from the set of MACsec keys after a period of time and/or the network controller 302 can instruct the network devices to use a different MACsec key from the set of MACsec keys according to a bandwidth of a link between the network devices. For example, 64-byte packets on a 100 megabits per second (Mbps) link will result in 1,562,500 packets per second, thus the MACsec key can be updated every 45 minutes. On a 1 gigabit per second (Gbps) link, the MACsec key can be updated every 4.5 minutes. On a 10 Gbps link, the MACsec key can be updated every 27 seconds. Provisioning network devices with sets of keys (e.g., as opposed to provisioning the network devices with a new individual key each time it is updated) can reduce overhead for the network controller and/or reduce delay in updating MACsec keys on the network devices, particularly for networks with fast links. Such examples can be particularly advantageous as compared to some previous approaches that required key negotiation between each Layer 2 switch that participated in a MACsec flow. The network controller 302 can be configured to update MACsec keys more often than is necessary (e.g., based on a desired level of security).

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method comprising:
   establishing, by a network controller, a first media access control security (MACsec) flow as a secure channel for communication between a first network device and a second network device through a first set of intermediate switches, wherein the first network device and the second network device are two endpoints of the MACsec flow;
   establishing, by the network controller, a second MACsec flow as a secure channel for communication between the first network device and a third network device through a second set of intermediate switches, wherein the first network device and the third network device are two endpoints of the second MACsec flow;
   provisioning, by the network controller, a first switch with a first MACsec key for encrypting data of the first MACsec flow;
   provisioning, by the network controller, the first switch with a second MACsec key for encrypting data of the second MACsec flow;
   provisioning, by the network controller, a second switch with the first MACsec key for decrypting the encrypted data of the first MACsec flow;
   provisioning, by the network controller, a third switch with the second MACsec key for decrypting the encrypted data of the second MACsec flow; and
   setting, by the network controller, forwarding rules for the MACsec flow on the first set of intermediate switches located between the first and second network devices of the first MACsec flow without provisioning the first set of intermediate switches with any MACsec keys for the first MACsec flow such that the intermediate switches forward the data of the first MACsec flow without decrypting or encrypting the data,
   wherein the first set of intermediate switches forwarding data of the first MACsec flow without decrypting or encrypting the data comprises the first switch and the second switch, and the second set of intermediate switches comprises the first switch and the third switch, such that the first switch is common to the first set and the second set of intermediate switches, and
   wherein the first network device and the second network device use a different MACsec key from a set of MACsec keys based on at least one criteria, the criteria comprising: using a different MACsec key after a period of time, using a different MACsec key after a number of packets have been encrypted or decrypted, and using a different MACsec key according to a bandwidth of a link between the first network device and the second network device.

2. The method of claim 1, wherein the first network device and the second network device comprise Layer 2 network switches and wherein the method comprises:
   instructing, by the network controller, the first network device to encrypt a MACsec packet according to the MACsec key;
   instructing, by the network controller, the number of intermediate switches to forward the encrypted MACsec packet toward the second network device using the forwarding rules without decrypting the encrypted MACsec packet; and
   instructing, by the network controller, the second network device to decrypt the encrypted MACsec packet according to the MACsec key.

3. The method of claim 1, wherein provisioning the first and the second network devices with the MACsec key comprises provisioning the first and the second network devices with symmetric MACsec keys.

4. The method of claim 1, wherein provisioning the first network device with the MACsec key comprises provisioning the first network device with the set of MACsec keys; and
   wherein provisioning the second network device with the MACsec key comprises provisioning the second network device with the set of MACsec keys.

5. The method of claim 4, wherein the method includes instructing the first network device and the second network device to use one of the set of MACsec keys.

6. The method of claim 1, wherein the method includes provisioning the first and the second network devices with an updated MACsec key.

7. A non-transitory machine-readable medium storing instructions executable by a network controller to cause the network controller to:
   establish a first media access control security (MACsec) flow as a secure channel for communication between a first network device and a second network device through a first set of intermediate switches, wherein the first network device and the second network device are two endpoints of the first MACsec flow;
   provision a first switch with a first MACsec keys for encrypting data of the MACsec flow;
   provision the first switch with a second MACsec key for encrypting data of the second MACsec flow;
   provision a second switch with the first MACsec key for decrypting the encrypted data of the first MACsec flow;
   provision a third switch with the second MACsec key for decrypting the encrypted data of the second MACsec flow;
   set forwarding rules for the MACsec flow on the first set of intermediate switches located between the first and second network devices of the first MACsec flow without provisioning the first set of intermediate switches with any MACsec keys for the first MACsec flow such that the first set of intermediate switches forward the data of the first MACsec flow without decrypting or encrypting the data,
   wherein the first set of intermediate switches forwarding data of the first MACsec flow without decrypting or encrypting the data comprises the first switch and the second switch, and the second set of intermediate switches comprises the first switch and the third switch, such that the first switch is common to the first set and the second set of intermediate switches;
   instruct the first network device to encrypt a MACsec flow packet using the first MACsec key from the set of MACsec keys;
   instruct the second network device to decrypt the encrypted MACsec flow packet using the particular MACsec key from a set of MACsec keys; and
   instruct the first network device and the second network device to use a different MACsec key from the set of MACsec based on at least one criteria, the criteria comprising: using a different MACsec key after a period of time, using a different MACsec key after a number of packets have been encrypted or decrypted, and using a different MACsec key according to a bandwidth of a link between the first network device and the second network device.

8. The non-transitory machine-readable medium of claim 7, wherein the first and the second network devices are switches located at the two endpoints of the MACsec flow for encrypting and decrypting communication between a server and a client device.

9. A network controller, comprising:
a processing resource in communication with a memory resource, wherein the memory resource includes a set of instructions that when executed by the processing resource cause the processing resource to:
  establish a first media access control security (MACsec) flow as a secure channel for communication between a first network device and a second network device through a first set of intermediate switches, wherein the first network device and the second network device are two endpoints of the first MACsec flow;
  establish a second MACsec flow as a secure channel for communication between the first network device and a third network device through a second set of intermediate switches, wherein the first network device and the third network device are two endpoints of the second MACsec flow;
  provision a first switch with a first media access control security (MACsec) key for encrypting data of the first MACsec flow;
  provision the first switch with a second MACsec key for encrypting data of the second MACsec flow;
  provision a second switch with the first MACsec key for decrypting the encrypted data of the first MACsec flow;
  provision a third switch with the second MACsec key for decrypting the encrypted data of the second MACsec flow;
  set forwarding rules for the first MACsec flow on the first set of intermediate switches located between the first and second endpoints of the first MACsec flow without provisioning the first set of intermediate switches with any MACsec keys for the first MACsec flow such that the first set of intermediate switches forward data of the first MACsec flow without decrypting or encrypting the data,
  wherein the first network device and the second network device use a different MACsec key from a set of MACsec keys based on at least one criteria, the criteria comprising: using a different MACsec key after a period of time, using a different MACsec key after a number of packets have been encrypted or decrypted, and using a different MACsec key according to a bandwidth of a link between the first network device and the second network device, and
  wherein the first set of intermediate switches forwarding data of the first MACsec flow without decrypting or encrypting the data comprises the first switch and the second switch, and the second set of intermediate switches comprises the first switch and the third switch, such that the first switch is common to the first set and the second set of intermediate switches.

10. The network controller of claim 9, wherein the instructions are executable by the processing resource to set forwarding rules for the second MACsec flow on the second set of intermediate switches located between the first and second endpoints of the second MACsec flow without provisioning the second set of intermediate switches with the second MACsec key to enable the second set of intermediate switches to forward data of the second MACsec flow without decrypting and encrypting the data.

11. The network controller of claim 9, wherein the instructions are executable by the processing resource to provision the first switch with a set of MACsec keys, wherein the first and the second MACsec keys are included in the set.

12. The network controller of claim 9, wherein the network controller, the first switch, the second switch, and the third switch are on a common Layer 2 network.

* * * * *